US 6,674,742 B1

(12) United States Patent
McDonald et al.

(10) Patent No.: US 6,674,742 B1
(45) Date of Patent: Jan. 6, 2004

(54) AUTOMATIC SDLC ROLE CONFIGURATION ON ROUTER INTERFACES

(75) Inventors: Rickie L. McDonald, Hollister, CA (US); Tsowen Chiang, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/349,332

(22) Filed: Jul. 8, 1999

(51) Int. Cl.[7] .................................................. H04J 3/16

(52) U.S. Cl. ....................................... 370/351; 370/465

(58) Field of Search ............................... 370/351, 352, 370/389, 503, 465, 466, 467, 469, 470, 471, 472, 474, 475, 476, 401, 901, 902, 903, 905, 907, 908, 911, 216, 227, 228, 229, 236, 337, 321, 444, 348

(56) References Cited

U.S. PATENT DOCUMENTS

| | | | | |
|---|---|---|---|---|
| 5,335,233 A | * | 8/1994 | Nagy ........................... | 714/748 |
| 5,473,608 A | | 12/1995 | Gagne et al. ............ | 370/85.13 |
| 5,546,549 A | | 8/1996 | Barrett et al. ................ | 395/309 |
| 5,812,545 A | * | 9/1998 | Liebowitz et al. .......... | 370/337 |

OTHER PUBLICATIONS

Tanenbaum, Andrew, *Computer Networks, Third Edition*, Copyright 1996, pp. 28–44 and 224–239.
World Wide Web page http://www.cisco.com/univercd/cc/t . . . uct/software/ios11/cbook/cappn.html, *Configuring APPN*, Copyright 1989–1998, pp. 1–29.
World Wide Web page http://www.cisco.com/univercd/cc/td/doc/cisintwk/idg4/nd2006.html, *Designing APPN Internetworks*, Copyright 1989–1998, pp. 1–39.
L. Wells, et al., Network Working Group, *Data Link Switching: Switch–to–Switch Protocol*, Apr. 1995, pp. 1–91.
World Wide Web page http://www.xs4all.nl/~tmax/book/wb_sdlc.html, *IBM Synchronous Data Link Control (SDLC)*, Jun. 11, 1999, pp. 1–8.
World Wide Web page http://www.biz.uiowa.edu/class/6K251_park/Student–Reports/etalbert/etalbert.html, *Key Technical Features*, Jun. 11, 1999, pp. 1–6.
World Wide Web page http://www.rs6000.ibm.com/doc_link/en_US/a_lib/aixprggd/progcomc/sdlc_doc_prot/html, *Transmission Frames*, Jun. 14, 1999, pp. 1–3.
World Wide Web page http://www.cisco.com/univercd/cc/td/doc/cisintwk/ito_doc/55172.html, *Synchronous Data Link Control and Derivatives*, Copyright 1989–1997, pp. 1–6.
IBM Systems Network Architecture, *APPN Architecture Reference*, Fifth Edition, Dec. 1996, pp. iii–X–43.
IBM Systems Network Architecture Formats, Copyright IBM Corp. 1977, 1996, pp. iii–B–25.
Systems Network Architecture, *Network Products Formats*–Copyright IBM Corp. 1993, pp. 2–1–2–18.

* cited by examiner

*Primary Examiner*—Dang Ton
(74) *Attorney, Agent, or Firm*—Cesari and McKenna, LLP

(57) ABSTRACT

A technique automatically configures the role of a router interface coupled to a synchronous data link control (SDLC) device, such as a physical unit (PU) station, of a computer network. When the router is activated and attached to a PU station over a communication link, it waits a predetermined period time before issuing any frames. A PU 2.1 or PU 4.0 station promptly initiates an exchange identification (XID) frame exchange upon being activated to determine its primary/secondary role according to the SDLC protocol. If no XID frames are received during the predetermined period, the router issues a null XID to the PU station, thereby forcing the PU station to respond with a configured XID identifying the station. If the PU station returns an XID0 frame, the router automatically configures the role of its interface to primary because a PU 2.0 device can only assume the role of a secondary.

21 Claims, 5 Drawing Sheets

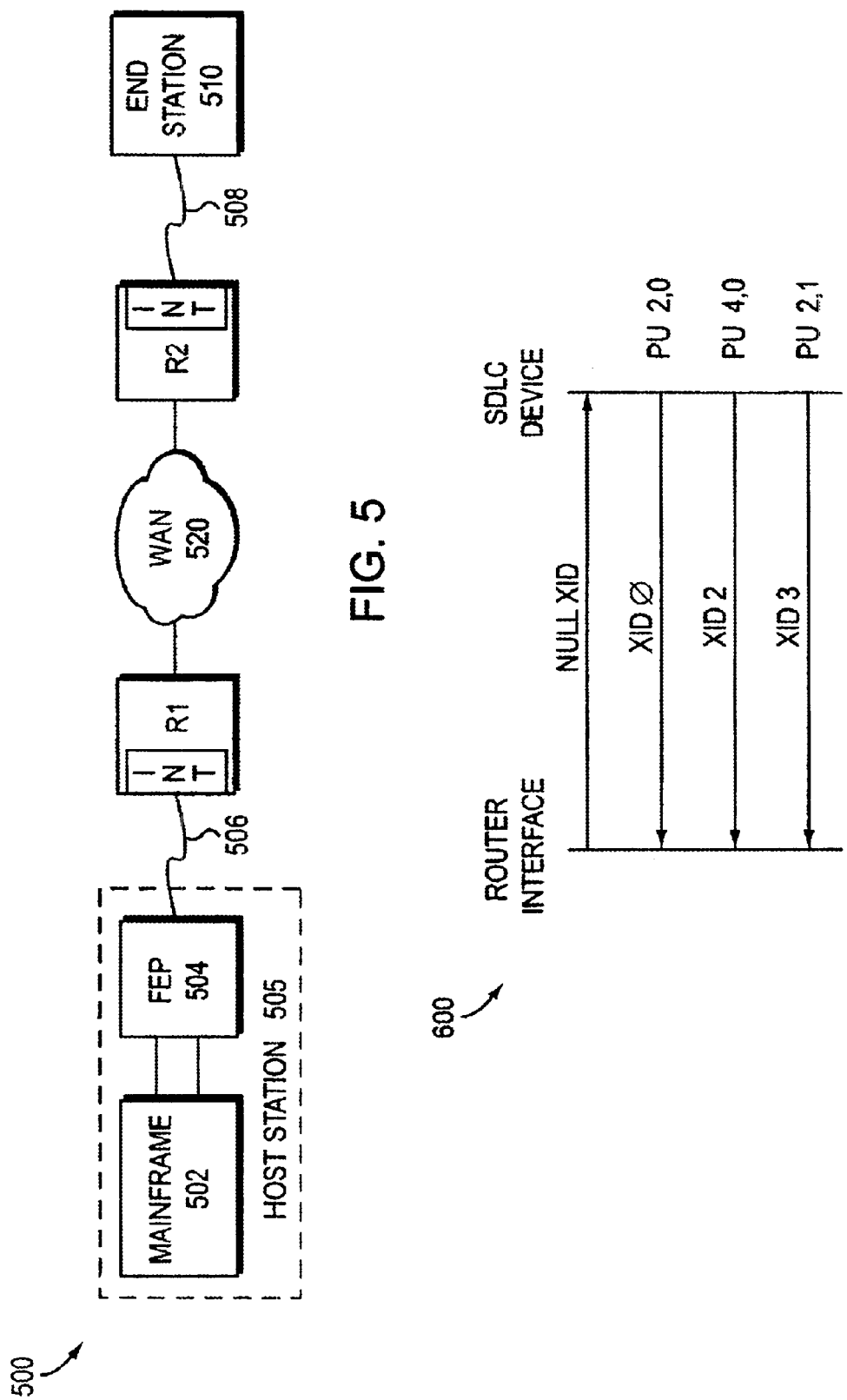

AUTOMATIC SDLC ROLE CONFIGURATION ON ROUTER INTERFACES

FIELD OF THE INVENTION

The present invention relates to computer networks and, more particularly, to configuration of devices in a computer network employing the Synchronous Data Link Control (SDLC) protocol.

BACKGROUND OF THE INVENTION

Data communications in a computer network involves the exchange of data between two or more entities interconnected by communication links. These entities are typically software programs executing on hardware computer platforms which, depending on their roles within a network, may serve as end stations or intermediate stations. Examples of intermediate stations may include bridges, switches and routers that interconnect the communication links to enable transmission of data between the end stations, which may comprise a computer. More generally, an end station connotes a source of or target for data that typically does not provide routing or other services to other computers on the network.

Communication software executing on the end stations correlate and manage data communication with other end stations. The stations typically communicate by exchanging discrete packets or frames of data according to predefined protocols. In this context, a protocol represents a set of rules defining how the stations interact with each other to transfer data. In addition, network routing software executing on the routers allows expansion of communication to other end stations. Collectively, these hardware and software components comprise a communications network and their interconnections are defined by an underlying architecture.

Most computer network architectures are organized as a series of hardware and software levels or "layers" within each station. These layers interact to format data for transfer between, e.g., a source station and a destination station communicating over the network. Specifically, predetermined services are performed on that data as it passed through each layer, and the layers communicate with each other by means of the predefined protocols. This design permits each layer to offer selected services to other layers using a standardized interface that shields the other layers from details of actual implementation of the services. The lower layers of these architectures are generally standardized and implemented in hardware and firmware, whereas the higher layers are usually implemented in the form of software. Examples of such communications architectures include the Systems Network Architecture (SNA) developed by International Business Machines (IBM) Corporation and the Internet Communications Architecture.

The Internet architecture is represented by four layers termed, in ascending interfacing order, the network interface, internetwork, transport and application layers. The primary internetwork layer protocol of the Internet architecture is the Internet Protocol (IP). IP is primarily a connectionless protocol that provides for internetworking routing, fragmentation and reassembly of exchanged packets—generally referred to as "datagrams" in an Internet environment—and which relies on transport protocols for end-to-end reliability. An example of such a transport protocol is the Transmission Control Protocol (TCP), which is implemented by the transport layer and provides connection-oriented services to the upper layer protocols of the Internet architecture. The term TCP/IP is commonly used to denote this architecture; the TCP/IP architecture is discussed in *Computer Networks*, 3rd edition, by Andrew S. Tanenbaum, published by Prentice-Hall, PTR in 1996, all disclosures of which are incorporated herein by reference, particularly at pages 28–44.

SNA is a communications framework widely used to define network functions and establish standards for enabling different models of computers to exchange and process data. SNA is essentially a design philosophy that separates network communications into several layers termed, in ascending order, the physical, data link control, path control, the transmission control, the data flow control, the presentation services and the transaction services layers. These layers are arranged to form a protocol stack in each communicating station of the network. FIG. 1 is a schematic block diagram of a prior art SNA protocol stack 100, wherein each layer of the stack represents a graduated level of function moving upward from physical connections (physical layer 102) to application software (transaction services layer 114).

In the SNA architecture, the data link control layer 104 is responsible for providing error-free transmission of data over a communication link between stations. An example of a bit-oriented protocol for data link control of a communication channel is the synchronous data link control (SDLC) protocol. Reliable communication in the data link layer (e.g., SDLC) is well known and described by Andrew Tanenbaum in his book *Computer Networks, Second Edition*, published in 1988, all disclosures of which are incorporated herein by reference, especially at pages 253–257.

SDLC identifies two types of stations: primary and secondary. Only one station on a SDLC link is a primary station; all other stations on the link are secondary stations. The role of a primary station is to control the operation of the data link between the primary and secondary stations. For example, the primary station may initiate data transmissions from the secondary stations by polling the secondary stations in a predetermined order. Secondary stations can then transmit if they have outgoing data. The primary station also establishes and "tears down" communication links and channels. Examples of communication channels and link types supported by the SDLC protocol include point-to-point and multipoint links, half-duplex and full-duplex transmission facilities, and circuit-switched and packet-switched networks.

FIG. 2 is a schematic block diagram of a SNA computer network 200 having a hierarchical topology. The network 200 comprises a plurality of stations that are defined by the SNA architecture in terms of physical units (PUs) and that communicate in a master-slave relationship as defined by the SDLC protocol. Specifically, a host mainframe 202 (e.g., a PU of type 5.0) is coupled to a front end processor, FEP 210 (e.g., a PU of type 4.0). The FEP 210 is configured to communicate with external devices, such as cluster controllers (CC) 220, each of which provides a concentrated data link interface for a number of locally-attached end stations 230. The cluster controllers 220 and end stations 230 manifest as PU type 2.0 devices.

Applications executing on end stations 230 typically access the network through logical units (LU) of the stations; accordingly, in a typical SNA network, a communication session connects two LUs in a LU—LU session. Activation and deactivation of such a session is addressed by Advanced Peer to Peer Networking (APPN) functions, which include session establishment and session routing within an APPN network. During session establishment, an APPN end node requests an optimum route for a session between two LUs; this route is calculated and conveyed to the end node by an APPN network node. Intermediate session routing occurs when the APPN network node is present in a session between the two end nodes.

An APPN network node is a full-functioning APPN router node having all APPN base service capabilities, including session services functions. An APPN end node, on the other hand, is capable of performing only a subset of the functions provided by an APPN network node. In an APPN network, all nodes are of a PU 2.1 device type. APPN network and end nodes are well-known and are, for example, described in detail in Systems Network Architecture Advanced Peer to Peer Networking Architecture Reference IBM Doc SC30-3422 and APPN Networks by Jesper Nilausen, printed by John Wiley and Sons, 1994, at pgs 11–83.

According to the SDLC protocol, the master-slave relationship exists between each of the stations of the network and manifests as a hand-shaking sequence between the stations. For example, the host mainframe 202 is a master or primary with respect to a slave or secondary host interface (SHI) 212 of the FEP 210. Likewise, remote interface (PRI) 214 of the FEP is a primary with respect to a secondary interface (SRI) 224 of the cluster controllers 220 and a remote interface (PRI) 226 of the controllers is a primary with respect to secondary end stations 230. The handshaking sequence involves requests issued by the primary and responses returned by the secondaries utilizing SDLC frames.

FIG. 3 is a schematic block diagram illustrating the format of a SDLC frame 300. The frame 300 is bounded by flag fields 302, each of which contains a unique flag pattern, i.e., 01111110 (Hex 7E), that enables a receiving station to determine the beginning and end of the frame. An address field 304 contains the address of the secondary station communicating with the primary, while a frame check sequence (FCS) field 306 is used to check the received frame for errors introduced by the channel. The FCS field 306 generally contains a cyclic redundancy check (CRC) calculation remainder.

The frame 300 further includes a control field 310 whose contents identify the function of the frame. Specifically, the control field 310 contains either an SDLC command or response. All frames transmitted by a primary station are commands, while frames transmitted by a secondary station are responses. The control field 310 uses three different formats, depending upon the category of SDLC command and response frames utilized. These formats include an unnumbered frame (U-frame 312) format, a supervisory frame (S-frame 314) format and an information frame (I-frame 320) format.

U-frames 312 are used for control purposes, such as to initialize secondaries. That is, U-frames 312 may be issued by a primary to a secondary to bring up a logical link (i.e., inquire whether the secondary is prepared to communicate with the primary) and to "tear down" the link. U-frames may be further employed for data link management and, as such, provides the commands and responses for control of information exchanges. An example of a SDLC command issued by a primary is an exchange station identification command that solicits an exchange identification (XID) response containing either the station identification of a secondary station or link negotiation information that allows the alteration of the primary or secondary relationship. In addition, a common mode setting command issued by a primary station is a Set Normal Response Mode (SNRM) frame (or Set Normal Response Mode Extended, SNRME) used for link initialization procedures and a common response is an Unnumbered Acknowledge (UA) frame that acknowledges receipt of the SNRM frame.

Once the secondary is initialized, the primary issues I-frames 320 and S-frames 314, the latter providing control information. For example, S-frames 314 are used to request and suspend transmission, report status, and acknowledge the receipt of I-frames. SDLC is a windowed protocol in that a number of frames may be issued from the primary to the secondary to which the secondary responds with a sequence number indicating the last accurately received frame. Thus, the secondary can acknowledge receipt of a number of frames at one time. Examples of S-frames are Receiver Ready (RR) frames, Receiver Not Ready (RNR) frames and Reject (REJ) frames, the latter of which are used to reject a frame and request issuance of the frame again.

I-frames 320 carry upper layer information and some control information. For example, I-frames contain send and receive sequence numbers 322, 324, along with a poll final (P/F) bit 326 for performing flow and error control. The send sequence number 322 refers to the number of the frame to be sent next, whereas the receive sequence number 324 provides the number of the frame to be received next. Both the sender and the receiver maintain send and receive sequence numbers. The primary uses the P/F bit 326 to relinquish control of the data link to the secondary. The secondary uses this bit to inform the primary whether the current frame is the last in its current response.

An optional information field 350 contains control information or data. The interpretation of the control field 310 determines whether a field 350 is present in the frame 300. The information field is of variable length and may be expanded to accommodate as much information as necessary, as long as it is expanded in 8-bit increments. The field 350 accommodates both numbered and unnumbered information fields. The format of the SDLC frame, along with the format and meanings of the information field bytes of the XID frames, are well known and described in Systems Network Architecture Formats, IBM Doc GA27-3136-16, IBM Corporation, October 1996.

FIG. 4 is a schematic diagram of a network arrangement 400 illustrating the interaction between SDLC devices, such as FEP 402 and PU end station 404 (similar to FEP 210 and end station 230 of FIG. 2) when configuring their SDLC roles in a conventional SNA network. If the end station 404 is a PU 2.0 device, it assumes a secondary role with respect to the (primary) FEP 402. The roles of the stations are not an issue in this case because a PU 2.0 device is always a secondary device. The primary then initiates configuration by issuing a SNRM frame to "bring-up" the logical data link between the stations. The PU 2.0 end station affirmatively responds to the SNRM frame with a UA frame and, thereafter, a logical link connection is established for transporting data between the stations.

Assume now that that end station 404 is a PU 2.1 device. The end station may initiate negotiation of primary/secondary status between itself and the FEP by issuing a XID frame to which the FEP responds with a configured XID identifying itself. A plurality of XID frames are exchanged among the devices to, inter alia, determine the primary/secondary roles of the devices. Note that a PU 2.1 node is capable of being a primary node because it has APPN capabilities. Although a PU 2.1 device may not be a primary with respect to a FEP, it may be a primary with respect to another PU (APPN) device.

After the XID exchange has determined the roles of the devices, the primary (e.g., FEP 402) issues a SNRM frame to the secondary (end station 404) which responds with a UA frame. As noted, this sequence establishes a logical link between the two devices and enables data communication between the devices. It should be noted that this same sequence applies to PU 2.1 and PU 4.0 stations when negotiating their roles as primary/secondary devices. The negotiated role is manifested within the last exchanged XID frame.

Data link switching (DLSw) is a forwarding mechanism for the SNA architecture over an IP backbone network, such as the Internet. A heterogeneous DLSw network is formed when two DLSw routers interconnect the end nodes of the APPN network by way of the IP network; the DLSw routers preferably communicate using a switch-to-switch protocol (SSP) that provides packet "bridging" operations at the SDLC protocol layer. The DLSw forwarding mechanism is also well-known and described in detail in Request for Comment (RFC) 1795 by Wells & Bartky, 1995 at pgs 1–91.

A router (such as a DLSw router) may be configured for primary/secondary role status with respect to a PU 2.1 and PU 4.0 device in accordance with a conventional process. According to the conventional approach, the router's interface is initially configured as a primary but if it receives a SNRM frame from a PU device, it changes its status to a secondary role. However, if the station is PU 2.0 device, the router is manually configured for its role as a primary. That is, an interface of the router that attaches to the PU 2.0 station at the data link layer requires user interaction to statically configure its role in accordance with the SDLC protocol. When statically configuring a router interface, a configuration table at each interface includes an SDLC role entry which, via manual user data entry, is loaded with either a primary or secondary role status. Manual configuration is undesirable because of the likehood of errors occurring; this, in turn, generates customer service calls.

Therefore, it is desirable to provide a technique for automatically configuring router interfaces for primary/secondary status with respect to PU stations so as to obviate the need for user intervention.

SUMMARY OF THE INVENTION

The invention comprises a technique for automatically configuring the role of a router interface coupled to a synchronous data link control (SDLC) device of a computer network. The SDLC device is preferably a physical unit (PU) station and may comprise, for example, a front end processor (FEP) or end station. When the router is activated and attached to a PU station over a communication link, it waits a predetermined period time before issuing any frames. A PU 2.1 or PU 4.0 station promptly initiates an exchange identification (XID) frame exchange upon being activated. The XID exchange comprises a negotiation process to determine the primary/secondary roles of the end points, such as the FEP and end station.

If no XID frames are received during the predetermined period, the router issues a null XID to the PU station. The null XID frame forces the PU station to respond with a configured XID identifying the station. Specifically, the PU station responds with one of three types of configured XID frames: XID0, XID2 and XID3. An XID0 denotes a PU 2.0 device, an XID2 denotes a PU 4.0 device and an XID3 denotes a PU 2.1 device. According to the invention if the PU station returns an XID0 frame, the router automatically configures the role of its interface to primary because a PU 2.0 device can only assume the role of a secondary.

If the PU station returns an XID2 or XID3, the router waits for resolution of the XID exchange (i.e., the last XID frame exchanged) between the end points to reveal the role of its attached station. Information is contained within the last XID frame that indicates the role of that station. Once the attached station's role is determined to be primary/secondary, the router may automatically configure its interface for secondary/primary status. If the router interface receives a Set Normal Response Mode frame, it configures itself as a secondary. The inventive technique described herein is unique in that the router essentially polls the PU stations to determine the role of its interface.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 5 is a schematic block diagram of a SNA computer network comprising a plurality of PU stations interconnected by a plurality of routers;

FIG. 6 is a diagram illustrating an exchange identification (XID) frame exchange between an interface of a router and a SDLC device, such as a PU station;

DETAILED DESCRIPTION OF AN ILLUSTRATIVE EMBODIMENT

Figure 1:
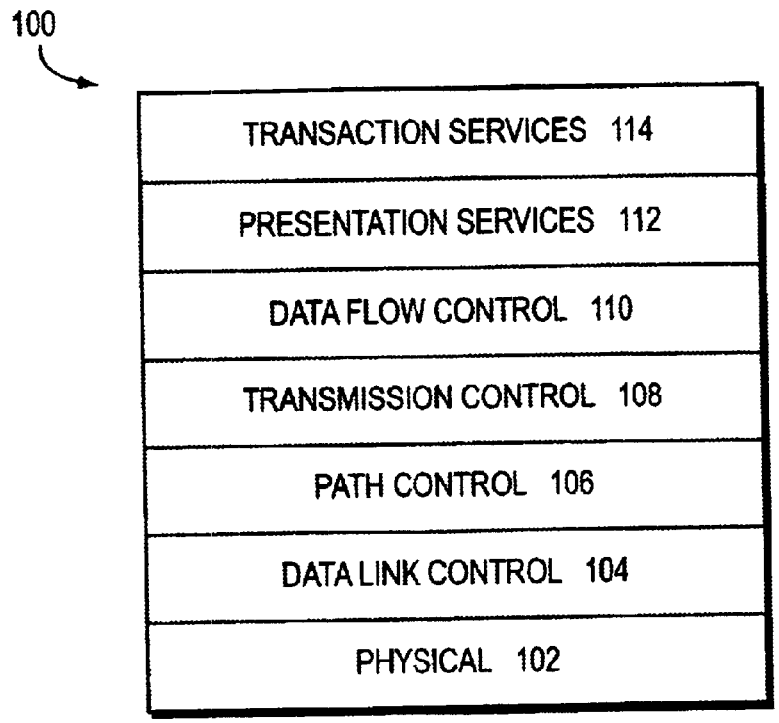
FIG. 1 is a schematic block diagram of a prior art Systems Network Architecture (SNA) protocol stack used to transmit data between stations of a SNA computer network.
Figure 2:
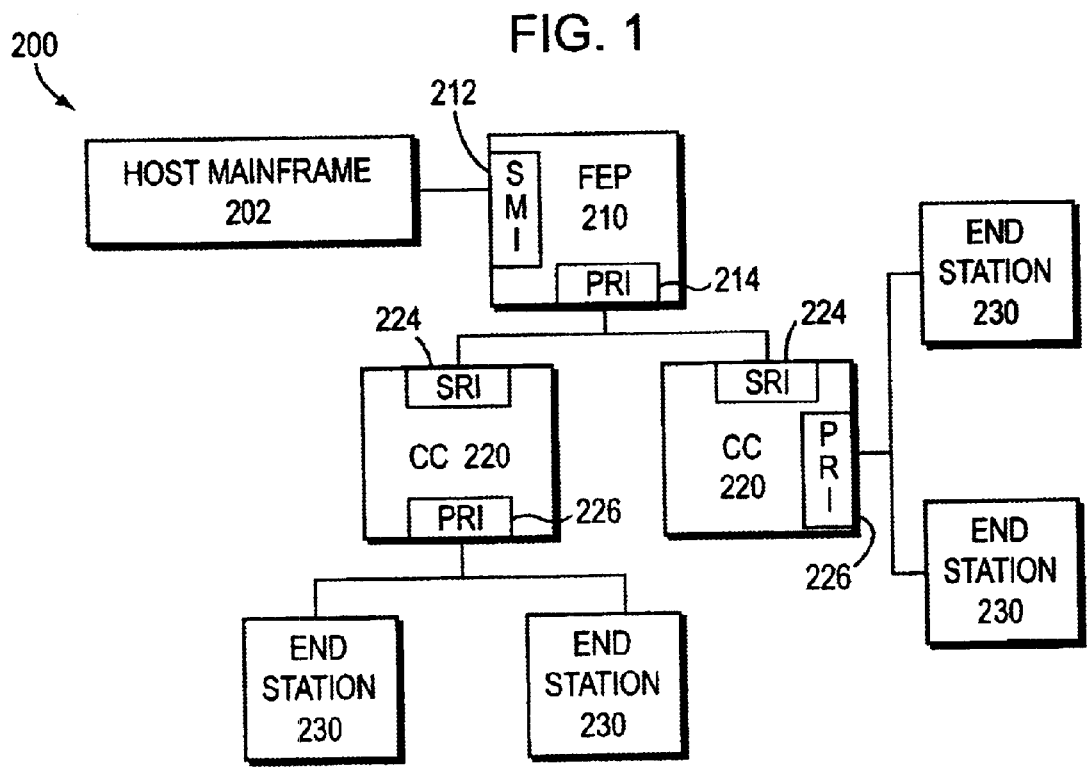
FIG. 2 is a block diagram of a SNA computer network comprising a plurality of stations interconnected by communication links in a hierarchical topology.

FIG. 5 is a schematic block diagram of a SNA computer network 500 that may be advantageously used with the present invention. The network 500 comprises a host station 505 coupled to an end station 510 via intermediate stations, such as routers R1–2, bordering a wide area network (WAN) cloud 520. The host station is preferably a Systems Network Architecture (SNA) host entity comprising a mainframe computer 502 coupled to a channel-attached, front end processor (FEP) 504. The end station 510 is preferably a SNA end station entity, which may include an advanced peer-to-peer network (APPN) node. The FEP 504 is connected to router R1 over communication link 506 and the end station 510 is connected to router R2 over communication link 508.

Each station typically comprises a plurality of interconnected elements, such as a processor, a memory and a network adapter. In the case of a router R1–2, the network adapter may include one or more interfaces (INTs) attached to the communication links 506, 508. The memory may comprise storage locations addressable by the processor and adapter (INTs) for storing software programs and data structures associated with the inventive technique. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the techniques described herein.

The SNA end station entity 510 includes a physical unit (PU) and one or more logical units (LU). A PU is defined as a component that monitors the station's resources, such as a concentration of LUs. Each station in a SNA network contains a PU and a LU and, as noted, is identified by a PU type. The PU is responsible for connecting the LUs to the host in a hierarchical arrangement. LUs are also identified as being of a particular type, and the LU type defines a particular set of SNA services implemented by the LU. As an example, the PU may be a computer coupled to a LU, the latter of which may comprise an intelligent storage device or another computer station; alternatively, the LU and PU could be processes executing within the same station.

The host and end station entities generally interact via hierarchical, master-slave SNA computing. When interconnected by routers R1–2, these entities form an integrated network 500 over WAN cloud 520, such as a Transmission Control Protocol/Internet Protocol (TCP/IP) network. In the illustrative embodiment, the routers R1–2 may be configured to implement (i) data link switching (DLSw) and/or APPN protocols across the WAN 520 and (ii) the synchronous data link control (SDLC) protocol over the communication links 506, 508 between the host and the end stations.

The master-slave relationship exists between each of the stations of the network 500 and manifests as a hand-shaking sequence between the stations. According to the SDLC protocol, each station (including routers R1–2) is configured as either a primary or secondary station on the communication links 506, 508. Typically, the router interfaces (INT) are manually (statically) configured for their roles as primary or secondary devices. The present invention provides a technique that alleviates the need to statically configure (via user intervention) the status/role of a router interface with respect to a PU 2.0 device. In addition, the inventive technique redefines the negotiation process that is typically performed between a router and a PU 2.1 –PU 4.0 device in order to determine role status.

Broadly stated, the invention comprises a technique for automatically configuring the role of a router interface coupled to a SDLC device of a SNA computer network. Initially, the role of the router interface coupled to the data link is not configured. According to the present invention after the router interface INT has been activated ("brought-up") and attached to a PU station over a communication link, it waits a predetermined amount of time (e.g., 5 seconds) before issuing any frames. A PU 2.1 or PU 4.0 device promptly initiates an XID frame exchange upon being activated. The XID exchange comprises a negotiation process to determine the primary/secondary roles of the end points. That is, the XID frames are exchanged between the FEP 504 and end station 510 over the WAN cloud 520. In contrast, a Set Normal Response Mode (SNRM) frame and other supervisory frames (S-frames) terminate locally at the routers.

For example assume an XID frame is issued by the end station 510 to R2 which encapsulates the XID frame via the switch-to-switch (SSP)/DLSw protocol and transports it over the WAN. The encapsulated frame is received by R1 and decapsulated to retrieve the XID frame; R1 then issues the latter frame over the SDLC link 506 to the FEP 504. The FEP responds with an XID that is received by R1 and transported over the WAN 520 to R2 for transmission to the end station 510. This exchange continues for approximately six (6) end-to-end transfers (3 XID exchanges in each direction).

The last XID frame issued by the FEP 504 contains information notifying the PU (and the intermediate routers) that it is a primary. At this point, the interface INT at R1 configures itself as a secondary and the interface INT at R2 configures itself as a primary because the PU is a secondary with respect to the primary FEP. Upon assuming the primary role, the R2 interface INT issues a SNRM frame to the secondary PU station 510 which responds with an unnumbered acknowledge (UA) frame. Note that the XID exchange may be initiated by only a PU 2.1 device or a PU 4.0 device; a PU 2.0 device cannot initiate an XID exchange.

If the FEP 504 is activated prior to the end station 510, the FEP issues an SNRM frame that is received by R1 and translated into a SSP protocol frame for transmission over the WAN cloud 520 in accordance with the DLSw protocol. Upon receiving the SNRM frame, the interface INT at R1 configures itself as a secondary. In response to receiving the SSP frame, R2 issues a null XID frame over the SLDC link 508 to its attached end station 510. Thus, the predetermined waiting period is not needed in this case since R2 is prompted earlier than the elapsed predetermined time to poll the end station as to its PU type and role.

If the attached end station is a PU 2.1 device or 4.0 device, then the negotiation process must ensue wherein the XIDs are exchanged. Depending upon the negotiation, one of the end points issues an SNRM and the other responds with a UA frame. Determination of a PU 2.1 or 4.0 PU status is made at the router by parsing the XID frame, as described below in connection with FIGS. 7 and 8. A process executing in the data link control layer 104 (FIG. 1) of the router parses and examine the frame contents to determine the primary/secondary role status of the router interface INT.

If no XID frames are issued during the predetermined time period, then the interface NT of router R2 issues a null XID to the PU station 510 over the data link after the period has lapsed. Such "polling for XID" forces the PU device to respond with a configured XID. FIG. 6 is a diagram illustrating an XID exchange 600 between a router interface and a SDLC device, such as PU station 510. In response to receiving the null XID, the PU station identifies itself by responding with one of three types of configured XIDs: XID0, XID2 and XID3. An XID0 denotes a PU 2.0 device, an XID2 denotes a PU 4.0 device and an XID3 denotes a PU 2.1 device. The formats and contents of the configured XID frames are well-known and described in Systems Network Architecture, Network Product Formats, IBM Doc LY43-0081-02, IBM Corporation, 1988, 1993, which is hereby incorporated by reference, especially at pgs. 2-1 through 2-18.

Figure 7:
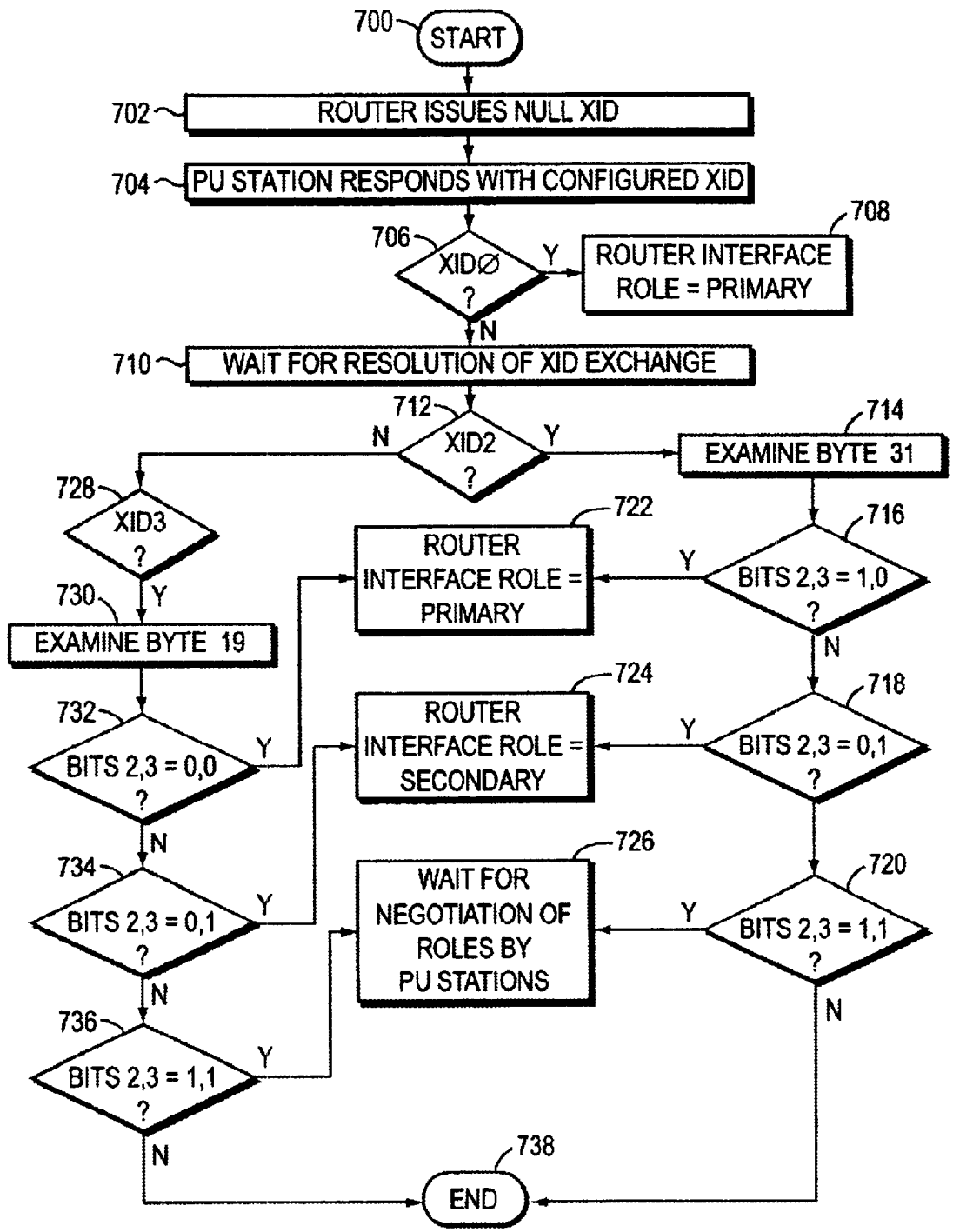
FIG. 7 is a flowchart illustrating the sequence of steps followed by a router when determining the SLDC role of its interface.

FIG. 7 is a flowchart 700 illustrating the sequence of steps followed by a router interface when determining the SDLC role of its interface. The process starts at Step 700 and proceeds to Step 702 where the router issues a null XID to the PU station after the predetermined period has lapsed. In Step 704, the station responds with a configured XID frame. In Step 706, it is determined whether the type of XID response returned by the PU station is an XID0. If an XID0 is returned, the router configures the role of its interface to primary (Step 708) because a PU 2.0 device can only assume the role of a secondary.

Figure 3:
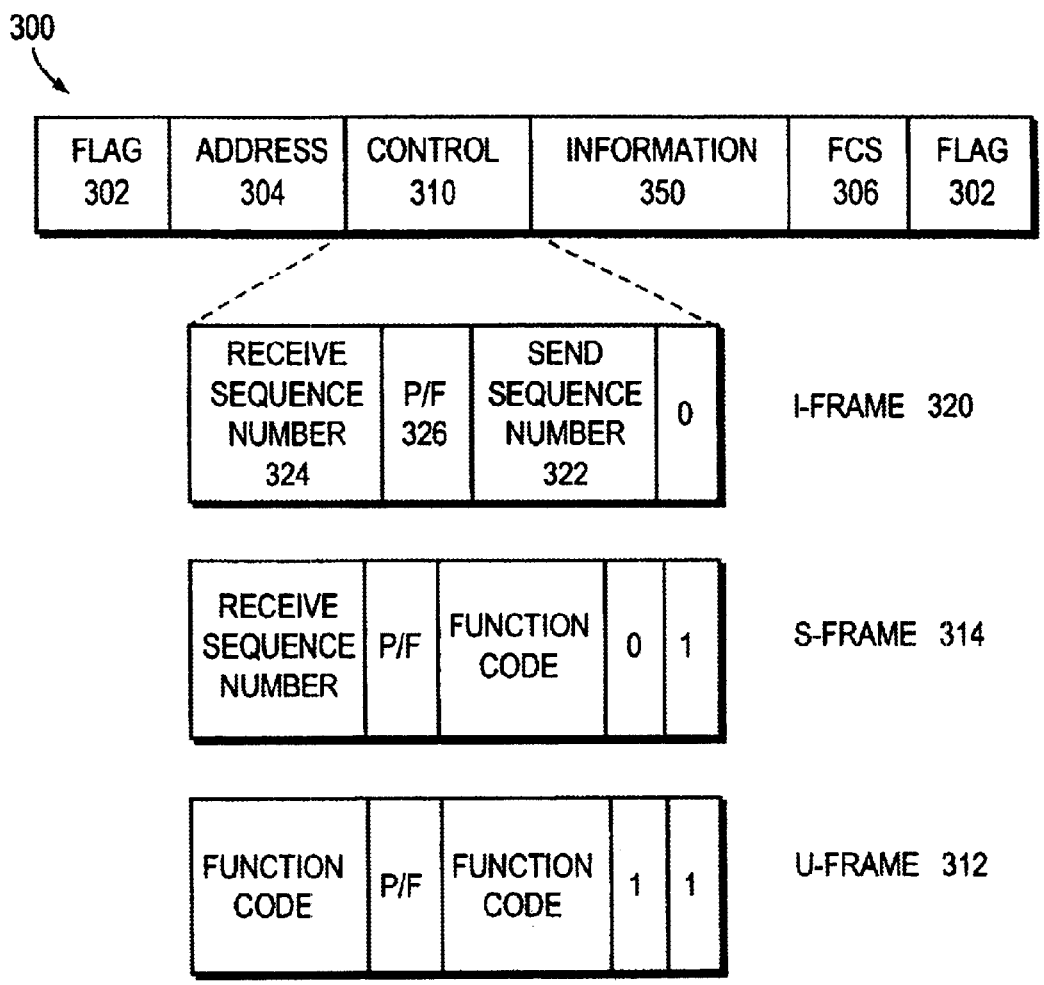
FIG. 3 is a schematic block diagram illustrating the format of a synchronous data link control (SDLC) protocol frame.
Figure 4:
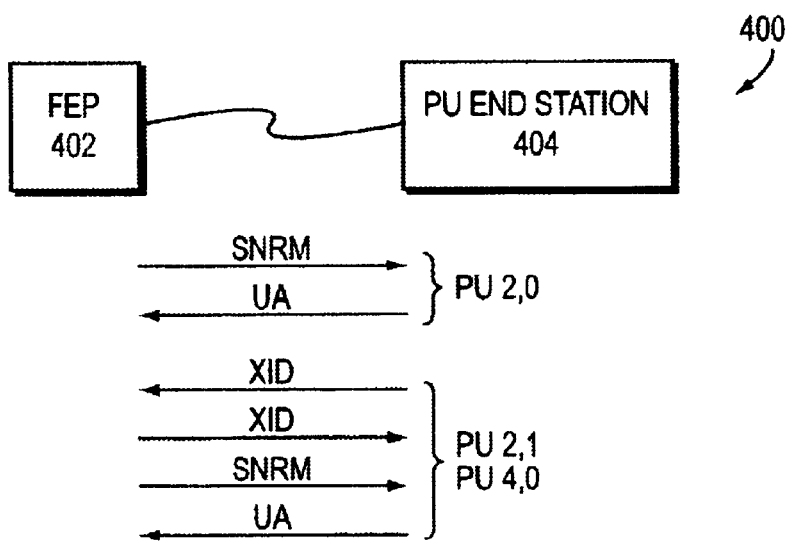
FIG. 4 is a schematic diagram of a network arrangement illustrating the interaction between a physical unit (PU) stations of a conventional SNA network when configuring their SDLC roles.
Figure 8:
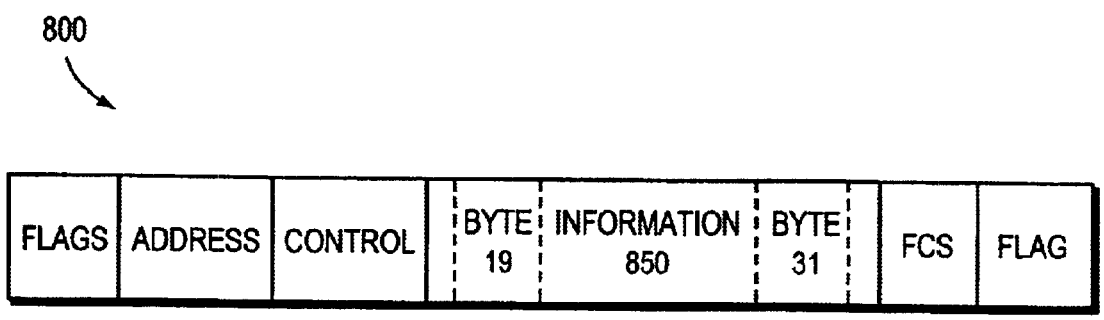
FIG. 8 is a diagram of a conventional SDLC XID frame including an information field that may be advantageously used with the present invention.

If a station returns either an XID2 or XID3, then the router interface waits for resolution of a XID capability exchange (waits for the last exchanged XID frame) to determine whether it configures itself as a primary or secondary role (Step 710). In Step 712, it is determined whether the type of XID response returned by the PU station is an XID2. If so, the router examines byte 31, bits 2 and 3 of the information field of a SDLC XID frame in Step 714. FIG. 8 is a diagram of a conventional SDLC XID frame 800 including information field 850, which is similar to the information field 350 (FIG. 3). If the value of bits 2 and 3 is binary 10 (Step 716), then the router configures the role of its interface to primary in Step 722. If the value of bits 2 and 3 is binary 01 (Step 718), the router assigns the interface a role of secondary in Step 724. If the value of bits 2 and 3 is binary 11 (Step 720), then the router waits for negotiation of roles by the PU stations in Step 726. Once the final XID exchange is made, either bit 2 or bit 3 will be asserted and the tests described above are applied to determine the role.

In Step 728 it is determined whether the type of XID response returned by the PU station is an XID3. If so, the router examines byte 19, bits 2 and 3 of the information field 850 in Step 730. If the value contained in bits 2 and 3 is a binary 00 (Step732), the end station is a secondary and the router configures its interface to primary in Step 722. If the value contained in bits 2 and 3 is binary 01 (Step 734), the end station is a primary and the router assigns its interface the role of secondary in Step 724. If the value contained in bits 2 and 3 is binary 11 (Step 736), the router waits for negotiation of the roles by the stations in Step 726. The last XID exchange between the PU stations contains a value of binary 00 or 01 in bits 2 and 3, and the tests described herein are applied to the value to determine the role. The sequence the ends at Step 738.

The information examined by the router (i.e., bits 2 and 3 of bytes 19 and 31) is typically contained in the XID frame exchanged among the PU stations, but that information is generally used only by those stations. The inventive technique enables use of these information bits by a router to automatically configure its interface. Thus, the present invention utilizes existing information to avoid user intervention when configuring router interfaces between PU stations over a SDLC communication link. Moreover, the inventive technique enables the router to poll the PU station to determine the role of its interface. Advantageously, the invention substantially increases the useability of SDLC devices, while reducing customer service calls.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for automatically configuring a role of a router interface coupled to a synchronous data link control (SDLC) device over a communication link of a computer network, the method comprising the steps of:

waiting a predetermined period of time after activating the router to receive a frame from the SDLC device over the communication link;

if no frame is received during the predetermined period, transmitting a null exchange identification (XID) frame from the router to the SDLC device forcing the device to respond with a configured XID identifying the device;

examining the configured XID at the router; and automatically configuring the role of the router interface to primary if the configured XID is an XID0 frame.

2. The method of claim 1 wherein the SDLC device is a physical unit (PU) station.

3. The method of claim 2 wherein the PU station is one of a front end processor and end station.

4. The method of claim 3 wherein the XID0 frame denotes a PU 2.0 device.

5. The method of claim 1 further comprising the step of, if the configured XID is one of an XID2 and XID3 frame:

waiting for resolution of an XID exchange between end points of the computer network, the XID exchange comprising a negotiation process to determine the primary/secondary roles of the end points; and automatically configuring the role of the router interface to one of secondary and primary if resolution of the XID exchange determines the role of the SDLC device to be one of primary and secondary.

6. The method of claim 5 wherein the step of waiting comprises the step of examining a last XID frame exchanged between the end points.

7. The method of claim 6 wherein the step of examining the last XID frame comprises the step of, if the configured XID is an XID2 frame, examining byte 31, bits 2 and 3 of an information field of the last XID frame.

8. The method of claim 7 further comprising the step of, if the value of bits 2 and 3 is binary 10, configuring the role of the router interface to primary.

9. The method of claim 7 further comprising the step of, if the value of bits 2 and 3 is binary 01, configuring the role of the router interface to secondary.

10. The method of claim 6 wherein the step of examining the last XID frame comprises the step of, if the configured XID is an XID3 frame, examining byte 19, bits 2 and 3 of an information field of the last XID frame.

11. The method of claim 10 further comprising the step of, if the value of bits 2 and 3 is binary 00, configuring the role of the router interface to primary.

12. The method of claim 10 further comprising the step of, if the value of bits 2 and 3 is binary 01, configuring the role of the router interface to secondary.

13. The method of claim 6 wherein the SDLC device is a physical unit (PU) station and wherein the end points comprise PU stations such as a front end processor and an end station.

14. The method of claim 13 wherein the XID2 frame denotes a PU 4.0 device and wherein an XID3 frame denotes a PU 2.1 device.

15. Apparatus for automatically configuring a role of a router interface coupled to a synchronous data link control (SDLC) device over a communication link of a computer network, the apparatus comprising:

means for waiting a predetermined period of time after activating the router to receive a frame from the SDLC device over the communication link;

if no frame is received during the predetermined period, means for transmitting a null exchange identification (XID) frame from the router to the SDLC device forcing the device to respond with a configured XID identifying the device;

means for examining the configured XID at the router; and means for automatically configuring the role of the router interface to primary if the configured XID is an XID0 frame.

16. The apparatus of claim 15 further comprising, if the configured XID is one of an XID2 and XID3 frame:

means for waiting for resolution of an XID exchange between end points of the computer network, the XID exchange comprising a negotiation process to determine the primary/secondary roles of the end points; and means for automatically configuring the role of the router interface to one of secondary and primary if resolution of the XID exchange determines the role of the SDLC device to be one of primary and secondary.

17. A computer readable medium containing executable program instructions for automatically configuring a role of a router interface coupled to a synchronous data link control (SDLC) device over a communication link of a computer network, the executable program instructions comprising program instructions for:

waiting a predetermined period of time after activating the router to receive a frame from the SDLC device over the communication link;

if no frame is received during the predetermined period, transmitting a null exchange identification (XID) frame from the router to the SDLC device forcing the device to respond with a configured XID identifying the device;

examining the configured XID at the router; and automatically configuring the role of the router interface to primary if the configured XID is an XID0 frame.

18. The computer readable medium of claim 17 further comprising program instructions for, if the configured XID is an XID2 frame examining byte 31, bits 2 and 3 of an information field of a last XID frame.

19. The computer readable medium of claim 18 further comprising program instructions for, if the value of bits 2 and 3 is binary 11:

waiting for resolution of an XID exchange between end points of the computer network, the XID exchange comprising a negotiation process to determine the primary/secondary roles of the end points; and automatically configuring the role of the router interface to one of secondary and primary if resolution of the XID exchange determines the role of the SDLC device to be one of primary and secondary.

20. The computer readable medium of claim 17 further comprising program instructions for, if the configured XID is an XID3 frame, examining byte 19, bits 2 and 3 of an information field of a last XID frame.

21. The computer readable medium of claim 20 further comprising program instructions for, if the value of bits 2 and 3 is binary 11:

waiting for resolution of an XID exchange between end points of the computer network, the XID exchange comprising a negotiation process to determine the primary/secondary roles of the end points; and automatically configuring the role of the router interface to one of secondary and primary if resolution of the XID exchange determines the role of the SDLC device to be one of primary and secondary.

\* \* \* \* \*